June 26, 1956 W. JUDA ET AL 2,752,306
PRODUCTION OF DRINKING WATER
Filed April 14, 1953
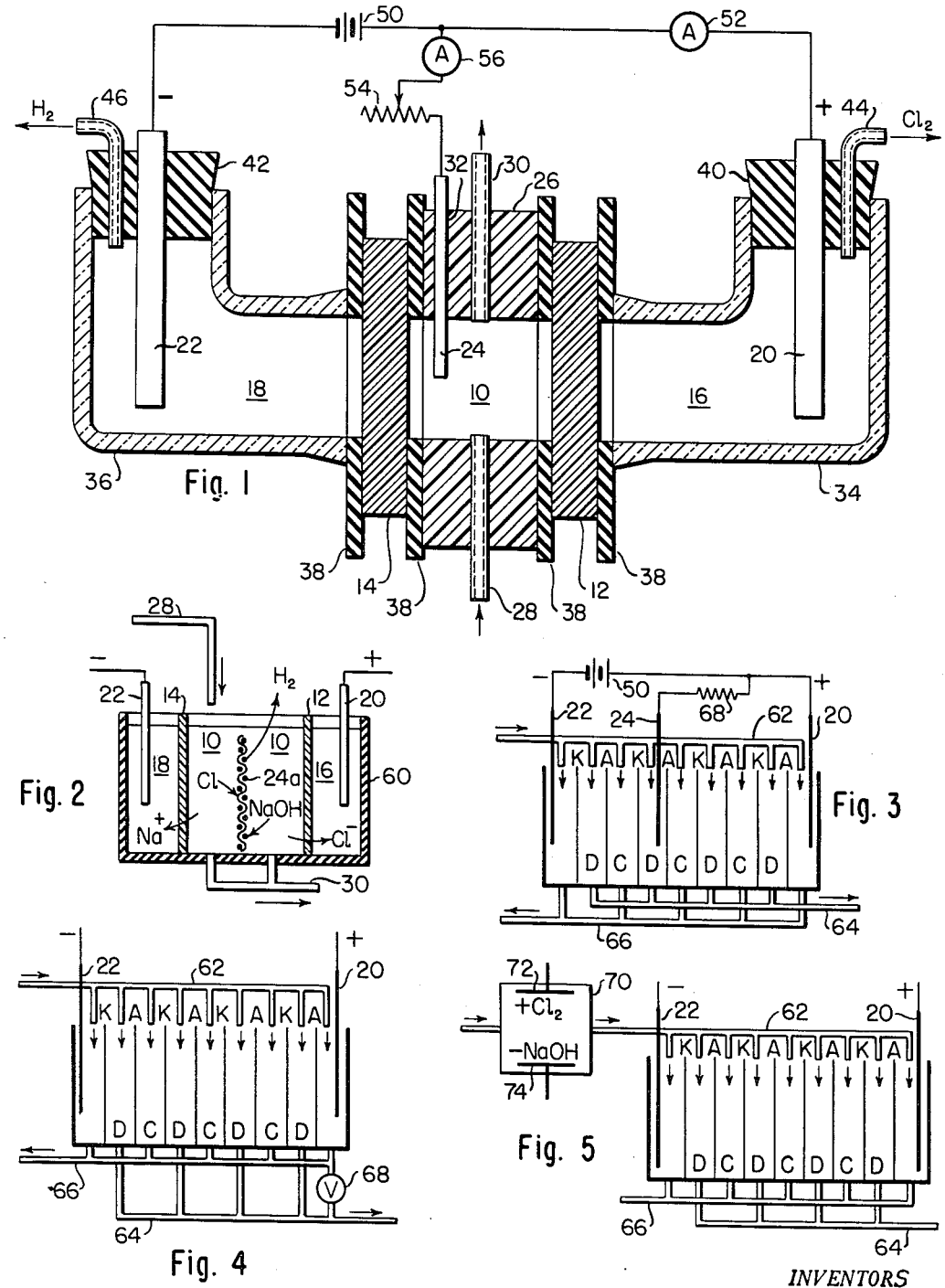
INVENTORS
WALTER JUDA
WAYNE A. McRAE
BY
ATTORNEYS

United States Patent Office 2,752,306
Patented June 26, 1956

2,752,306
PRODUCTION OF DRINKING WATER

Walter Juda, Lexington, and Wayne A. McRae, Arlington, Mass., assignors to Ionics, Incorporated, Cambridge, Mass., a corporation of Massachusetts Application April 14, 1953, Serial No. 348,721

5 Claims. (Cl. 204—151)

The present invention relates to the treatment of aqueous electrolytic solutions containing dissolved chloride to remove all or part of the electrolyte from the solution and to render it aseptic. This application continues in part, divisional matter from our copending application, Ser. No. 146,706, filed February 28, 1950, now Patent No. 2,636,852.

In many areas of the world, the available water supply contains such a high concentration of dissolved salts, including chloride salts, as to render the water unfit for human consumption. The present invention provides an improved method for simultaneously removing the electrolyte and chlorinating the water to render it safe for drinking.

In our above identified copending application, it is shown that dissolved electrolyte may be removed from aqueous solutions by placing the solution in contact with a cation permeable barrier and with an anion permeable barrier and passing an electric current in series through the solution and barriers in a direction to cause anions to migrate toward and through the anion permeable barrier. The present invention is directed to the improvement which consists in discharging chloride ions in the solution to liberate active chlorine (which may be in the form of free chlorine or hypochlorite ions) and mixing the chlorine thus liberated with the solution before, after or during demineralization. Chlorination is accomplished in this invention by contacting at least part of the chloride-containing solution with an anode of area and potential sufficient to produce a bactericidal concentration of active chlorine.

Representative preferred embodiments of this invention are described in detail below, with references to the accompanying drawings in which:

Fig. 1 is an elevation in cross section of one form of apparatus for carrying out the invention;

Fig. 2 is a schematic representation of alternative apparatus in which the chlorine-producing anode is an electrically floating electrode;

Fig. 3 is a schematic representation of apparatus for practicing the invention in which there are provided a plurality of demineralizing compartments in series;

Fig. 4 is a schematic representation for carrying out the invention in which chlorine produced at the anode supplying current for demineralization is introduced into the demineralized solution, and Fig. 5 is a schematic representation of apparatus for practicing the invention in which a separate cell having an anode and a cathode is utilized to produce chlorine prior to demineralization of the solution.

The apparatus shown in Fig. 1 consists in general, of a diluting chamber 10 separated from an anode compartment 16 by an anion permeable barrier 12, and separated from a cathode compartment 18 by a cation permeable barrier 14. A graphite anode 20 and an iron cathode 22 are provided respectively in the anode compartment 16 and cathode compartment 18 and an auxiliary graphite anode 24 is provided in the diluting compartment 10. The diluting compartment is conveniently formed as a boring through a block of insulating material 26 with an inlet conduit 28 and an outlet conduit 30 being provided for the passage of the solution through the diluting chamber, and with a passageway 32 leading into the diluting chamber 10 through which the auxiliary anode 24 is inserted. The anode compartment 16 and cathode compartment 18 are defined by glass elbows 34 and 36 respectively, between the inner ends of which and the opposite sides of the central block 26, are situated the anion permeable barrier 12 and the cation permeable barrier 14 respectively, each flanked by gaskets 38 to provide tight joints between the abutting members. The outer ends of the elbows 34 and 36 are closed by stoppers 40 and 42 respectively, through each of which are provided passageways for the anode 20 and cathode 22 and vents 44 and 46, for gas generated within these compartments.

In operating this apparatus in accordance with this invention, a source of D. C. voltage 50 is connected across the anode 20 and cathode 22, the anode being of positive polarity, through an ammeter 52. The auxiliary anode 24 is connected with the positive side of the power supply 50 through a variable dropping resistor 54 and an ammeter 56.

The following example illustrates the use of this invention in the demineralization and sterilization of a contaminated aqueous solution 0.65 N in sodium chloride, a concentration roughly equivalent to that of sea water.

Example I

The anode compartment 16 and cathode compartment 18 were each filled with the sodium chloride solution, which was also circulated through the diluting chamber 10 at the rate of 10 cc. per hour, and a current of 300 milliamperes was passed between the anode 20 and cathode 22, and a current of 0.025 milliampere was passed into the solution in the diluting compartment 10 through the auxiliary anode 24. Under these operating conditions, the effluent treated solution was found to have a chlorine concentration of about 4 parts per million and a salt concentration less than 0.01 N and bacteria (*B. coli* were killed by the treatment. To obtain a higher degree of chlorination, the variable resistor 54 was adjusted to provide a current of 0.25 milliampere through the auxiliary anode 24. This change of operating conditions resulted in a free chlorine concentration in the effluent solution of about 40 parts per million, a concentration effective for the sterilization of highly polluted waters.

A modified method providing for the electrolysis of chloride ions in a diluting chamber is shown in Fig. 2. In this embodiment, the diluting chamber 10 is formed in a suitable container 60 between the anion permeable barrier 12 and cation permeable barrier 14 into which connects the influent conduit 28 and effluent conduit 30, and externally of which are provided the anode compartment 16 and anode 20 therein, and cathode compartment 18 and cathode 22 therein. The auxiliary anode 24a in this embodiment instead of being connected to an external source of potential, consists of an electrically floating platinum screen which depends for its voltage upon the potential gradient established during operation of the system between the anode 20 and cathode 22. In this embodiment, control over the amount of chlorine produced at the auxiliary anode is maintained through the relative proportion of the cross-sectional area in the diluting compartment, that is, the area normal to the flow of current through the cell, occupied by the auxiliary anode 24a which in turn controls the fraction of the current carried by the auxiliary electrode. In this embodiment, the cathode 22 side of the auxiliary electrode 24a functions as an anode in the production of free chlorine from the chloride ions in the solution being treated, while the opposite side functions as a cathode and produces sodium hydroxide through the liberation of hydrogen. There is thus produced instead of free chlorine in the treated solution, the bactericidally active sodium hypochlorite.

Further alternative systems for practicing this invention are shown schematically in Figs. 3, 4 and 5, in each of which is utilized an electrodialysis cell having alternating diluting compartments D and concentrating compartments C defined between alternating cation permeable barriers K and anion permeable barriers A, with the anode 20 being situated in one terminal compartment adjacent an anion permeable barrier, and the cathode 22 being situated in the other terminal compartment adjacent a cation permeable barrier. The solution to be treated is introduced into diluting compartments D and concentrating compartments C through an influent manifold 62 while the diluted product and concentrated product are withdrawn separately through the manifold effluent conduits 64 and 66 respectively. In the embodiment shown in Fig. 3 an auxiliary anode 24 is provided in one of the diluting compartments and is connected through a dropping resistor 68 to a source of potential, conveniently the power supply 50 to which the anode 20 and cathode 22 are also connected.

In the operation of this type of apparatus, chlorine is produced in only one of the diluting cells and is dissolved in the solution therein. This solution is, however, withdrawn in the common effluent manifold 64 along with the fractions of solution treated in the other diluting compartments, whereby active chlorine is introduced and mixed with all of the diluted product produced in the cell. In the operation of this type of apparatus, it will be understood that the current supplied to the auxiliary anode 24 must be sufficient to cause the liberation of the total chlorine requirements for the entire diluted product, and if these requirements cannot be supplied by a single auxiliary anode, additional anodes may be provided in other diluting compartments, or, if desired, in all the diluting compartments.

In the embodiment shown in Fig. 4 no auxiliary anode is provided. A fraction of the solution in the anode compartment containing dissolved chlorine liberated at the anode 20 is withdrawn and introduced into the diluted product conduit 64 through a valved conduit 68. In this system, a slight amount of sodium chloride which is also present in the solution in the anode compartment, is introduced into the diluted product and accordingly limits the degree of demineralization that may be obtained, but such small amounts of salt in the demineralized product may frequently be tolerated.[1]

In the apparatus shown in Fig. 5, the solution to be demineralized is passed through a separate electrolysis cell 70 before its introduction into the diluting chambers D of the demineralization equipment. The electrolysis cell conveniently consists of a container provided with an anode 72 and cathode 74 which are connected to a D. C. power supply (not shown) which is controlled to effect the liberation of sufficient chlorine at the anode to render the solution aseptic. In this embodiment, sodium hydroxide is formed at the cathode and combines with the chlorine to form sodium hypochlorite as the effective bactericidal component.

From the foregoing description of this invention, it will be seen that there is provided a convenient and efficient process for converting saline natural waters such as sea water or brackish waters in potable and aseptic water entirely suitable for human consumption. The process, moreover, is effected solely by electrical energy and does not depend in any manner on the addition of chemicals from outside sources. Although numerous embodiments have been described in detail as illustrative of this invention, it is contemplated that other modifications will readily occur to those skilled in the art and that such modifications may be made without departing from the scope of this invention.

A detailed description of the operation and construction of demineralization apparatus employing alternating diluting and concentrating compartments defined between alternating cation permeable membranes and anion permeable membranes is contained in the copending application of William E. Katz and Norman W. Rosenberg, Ser. No. 300,302, filed July 22, 1952, to which reference is directed for a further and more complete discussion of such systems.

The anion permeable and cation permeable barriers used in this invention are suitably those electropositively and electronegatively charged structures through which either anions or cations may be transferred substantially exclusively of ions of the opposite sign. Particularly suitable are barriers which may be defined as solid unfractured structures comprising as an essential part extending substantially throughout, a predominant amount of an ion exchange resin which comprises an insoluble infusible synthetic organic polymeric matrix, dissociable ionic groups chemically bonded to said matrix and water in gel relationship with said matrix. The ionic groups should have a dissociation constant ($k$) of at least $10^{-5}$ and should be present in an amount of at least 3.0 milliequivalents per gram of dry resin when $k$ is between $10^{-5}$ and $10^{-3}$ and in an amount of at least 0.3 milliequivalent per gram of dry resin when $k$ is $10^{-3}$ or greater. The water should be present in an amount of at least 15% of the weight of dry resin. Structures comprising anion exchange resins (that is having ionic groups dissociable with a free mobile anion) are anion permeable, and structures comprising cation exchange resins (that is having ionic groups dissociable into a free mobile cation) are cation permeable. Such structures in general and a method of preparing them are described in our copending application, Serial No. 103,784, filed July 9, 1949, now Patent No. 2,636,851.

It will be understood that in practicing this invention, sufficient chlorine should be liberated at the anode and introduced into the demineralized solution to exceed the breaking point of the solution in accordance with standard chlorination practice. (See, e. g. Nordell, Water Treatment for Industrial and Other Uses, Reinhold Publishing Corporation, 1951, page 276 and generally.)

Having thus disclosed our invention and described in detail preferred embodiments thereof, we claim and desire to secure by Letters Patent:

1. In the method of producing demineralized water from aqueous electrolytic solutions containing dissolved chloride wherein the solution is contacted with an anion permeable barrier and a cation permeable barrier and a direct electric current is passed in series through the solution and contacting barriers, the step of rendering said solution aseptic comprising contacting at least a fraction of said solution with an electrode, applying an anodic potential to said electrode to discharge chloride ions and liberate chlorine, and mixing the chlorine with said solution.

2. The method of producing aseptic demineralized water from aqueous electrolytic solutions containing dissolved chloride comprising passing a first fraction of the solution in contact with an anion permeable barrier and with a cation permeable barrier and passing a direct electric current in series through the first fraction and said barriers, contacting a second fraction of the solution with an electrode, applying an anodic potential to said electrode to cause discharge of chlorine ions and to liberate ---
[1] If such small amounts of salt may not be tolerated, the chlorine solution from the anode compartment may be mixed instead with influent solution, for instance, by connecting conduit 68 to the influent manifold 62.

chlorine therein and mixing at least a portion of the second fraction with the first fraction to introduce chlorine into said first fraction.

3. The method of treating an electrolytic solution containing dissolved chloride to remove chloride therefrom and to render the solution aseptic comprising contacting said solution with (1) a cation permeable barrier, (2) an anion permeable barrier and (3) and an electrode therebetween, passing a direct electric current between said barriers and through said solution in a direction to cause anions to migrate toward and through the anion permeable barrier, and applying an anodic potential to said electrode to cause free chlorine to be liberated and dissolved in situ in said solution.

4. The method of treating an electrolytic solution containing dissolved chloride to remove electrolyte therefrom and to render the solution aseptic comprising (1) separating said solution from a first adjacent solution with a cation permeable barrier, (2) separating said solution from a second adjacent solution with an anion permeable barrier, (3) contacting said solution with an electrode situated between said barriers, (4) passing a direct electric current in series through the solutions and separating barriers in a direction to cause anions to migrate toward and through the second barrier, and (5) applying an anodic potential to said electrode to cause chlorine to be liberated and dissolved in said solution.

5. The method defined by claim 4 wherein the solution being treated is flowed between and in contact with the said barriers and in contact with said electrode.

References Cited in the file of this patent
UNITED STATES PATENTS

| | | |
|---|---|---|
| 1,235,064 | Schwerin | July 31, 1917 |
| 1,371,698 | Linder | Mar. 15, 1921 |
| 1,388,754 | Pechkranz | Aug. 23, 1921 |
| 2,044,261 | Southgate | June 16, 1936 |
| 2,636,952 | Juda et al. | Apr. 28, 1953 |